US012593344B2

(12) United States Patent
Ganesan et al.

(10) Patent No.: US 12,593,344 B2
(45) Date of Patent: Mar. 31, 2026

(54) SIDELINK RESOURCE CONFLICT INDICATION

(71) Applicant: Lenovo (Singapore) Pte. Ltd., New Tech Park (SG)

(72) Inventors: Karthikeyan Ganesan, Kronberg im Taunus (DE); Prateek Basu Mallick, Dreieich (DE); Joachim Loehr, Wiesbaden (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 359 days.

(21) Appl. No.: 18/256,011

(22) PCT Filed: Dec. 6, 2021

(86) PCT No.: PCT/IB2021/061381
§ 371 (c)(1),
(2) Date: Jun. 5, 2023

(87) PCT Pub. No.: WO2022/118301
PCT Pub. Date: Jun. 9, 2022

(65) Prior Publication Data
US 2024/0057121 A1     Feb. 15, 2024

Related U.S. Application Data

(60) Provisional application No. 63/121,814, filed on Dec. 4, 2020.

(51) Int. Cl.
H04W 72/25 (2023.01)
H04L 1/1812 (2023.01)
(Continued)

(52) U.S. Cl.
CPC ........... H04W 72/25 (2023.01); H04L 1/1812 (2013.01); H04L 1/1854 (2013.01); H04L 1/1887 (2013.01)

(58) Field of Classification Search
CPC .... H04W 72/25; H04L 1/1812; H04L 1/1854; H04L 1/1887
See application file for complete search history.

(56) References Cited

U.S. PATENT DOCUMENTS

2021/0028891 A1 *  1/2021  Zhou ........................ H04W 4/40
2021/0144750 A1 *  5/2021  Cao .................... H04W 72/0453
(Continued)

FOREIGN PATENT DOCUMENTS

JP      2023522593 A    5/2023
WO      2021207473 A1   10/2021

OTHER PUBLICATIONS

PCT/IB2021/061381, "Notification of Transmittal of the International Search Report and the Written Opinion of the International Searching Authority, or the Declaration", International Searching Authority, Mar. 7, 2022, pp. 1-13.
(Continued)

*Primary Examiner* — Kent Krueger
(74) *Attorney, Agent, or Firm* — Kunzler Needham & Hilton

(57) ABSTRACT

Apparatuses, methods, and systems are disclosed for indicating a sidelink resource conflict using a feedback channel. One apparatus includes a receiver that receives SCI from a peer UE on a first resource of a PSCCH, where the SCI contains information indicating future resources reserved for future transmissions. The apparatus includes a processor that determines whether there is a resource conflict, said resource conflict including an expected collision on the future resources. The apparatus includes a transmitter that transmits feedback to the peer UE on a feedback resource, where
(Continued)

Conflict ind → 330
HARQ-ACK reports → 335

320

Conflict indication
HARQ-ACK reports 330
335

325 the feedback includes an indication of whether there is a resource conflict.

20 Claims, 9 Drawing Sheets

(51) Int. Cl.
  *H04L 1/1829* (2023.01)
  *H04L 1/1867* (2023.01)

(56) References Cited

U.S. PATENT DOCUMENTS

| | | | |
|---|---|---|---|
| 2022/0109546 A1* | 4/2022 | Panteleev | H04L 5/0053 |
| 2022/0346118 A1* | 10/2022 | Wu | H04L 5/0044 |
| 2023/0156824 A1* | 5/2023 | Yao | H04L 5/0044 |
| | | | 370/328 |
| 2024/0014978 A1* | 1/2024 | Ji | H04L 5/0094 |

OTHER PUBLICATIONS

Intel Corp., "FL summary#1 of issues for 7.2.4.2.2—V2X Mode 2", 3GPP TSG RAN WG1 Meeting #102-E R1-2006976, Aug. 17-28, 2020, pp. 1-28.

Fujitsu, "Considerations on Inter-UE Coordination for Mode 2 Enhancements", 3GPP TSG RAN WG1 Meeting #103-E R1-2007788, Oct. 26-Nov. 13, 2020, pp. 1-20.

ITRI, "Discussion on enhancement for NR V2X Mode 2", 3GPPTSG RAN WG1 #103-e R1-2007878, Oct. 26-Nov. 13, 2020, pp. 1-5.

LG Electronics, "Discussion on feasibility and benefits for mode 2 enhancement", 3GPP TSG RAN WG1 Meeting #103-e R1-2007896, Oct. 26-Nov. 13, 2020, pp. 1-26.

Mediatek Inc., "Discussion on Mode 2 enhancements", 3GPP TSG RAN WG1 #103-e R1-2008975, Oct. 26-Nov. 13, 2020, pp. 1-4.

Ericsson, "Feasibility and benefits of mode 2 enhancements for inter-UE coordination", 3GPP TSG-RAN WG1 Meeting #103-e R1-2009073, Aug. 17-28, 2020, pp. 1-8.

Qualcomm Inc., "Reliability and Latency Enhancements for Mode 2", 3GPP TSG RAN WG1 Meeting #103-e R1-2009273, Oct. 26-Nov. 13, 2020, pp. 1-19.

3GPP, "3rd Generation Partnership Project; Technical Specification Group Radio Access Network; Study on evaluation methodology of new Vehicle-to-Everything (V2X) use cases for LTE and NR; (Release 15)", 3GPP TR 37.885 V15.3.0, Jun. 2019, pp. 1-38.

3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.4.0, Sep. 2020, pp. 1-58.

3GPP, "3rd Generation Partnership Project; Technical Specification Group Radio Access Network; NR; Physical channels and modulation (Release 16)", 3GPP TS 38.211 V16.3.0, Sep. 2020, pp. 1-133.

3GPP, "3rd Generation Partnership Project; Technical Specification Group Radio Access Network; NR; Multiplexing and channel coding (Release 16)", 3GPP Ts 38.212 V16.3.0, Sep. 2020, pp. 1-152.

3GPP, "3rd Generation Partnership Project; Technical Specification Group Radio Access Network; NR; Physical layer procedures for control (Release 16)", 3GPP TS 38.213 V16.3.0, Sep. 2020, pp. 1-179.

3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.

3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.

3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

VIVO, "Discussion on mode 2 enhancements", 3GPP TSG RAN WG1 #103-e R1-2007689, Oct. 26-Nov. 13, 2020, pp. 1-9.

NTT DOCOMO, Inc., "Resource allocation for reliability and latency enhancements", 3GPP TSG RAN WG1 #103 R1-2009194, Oct. 26-Nov. 13, 2020, pp. 1-8.

* cited by examiner

800

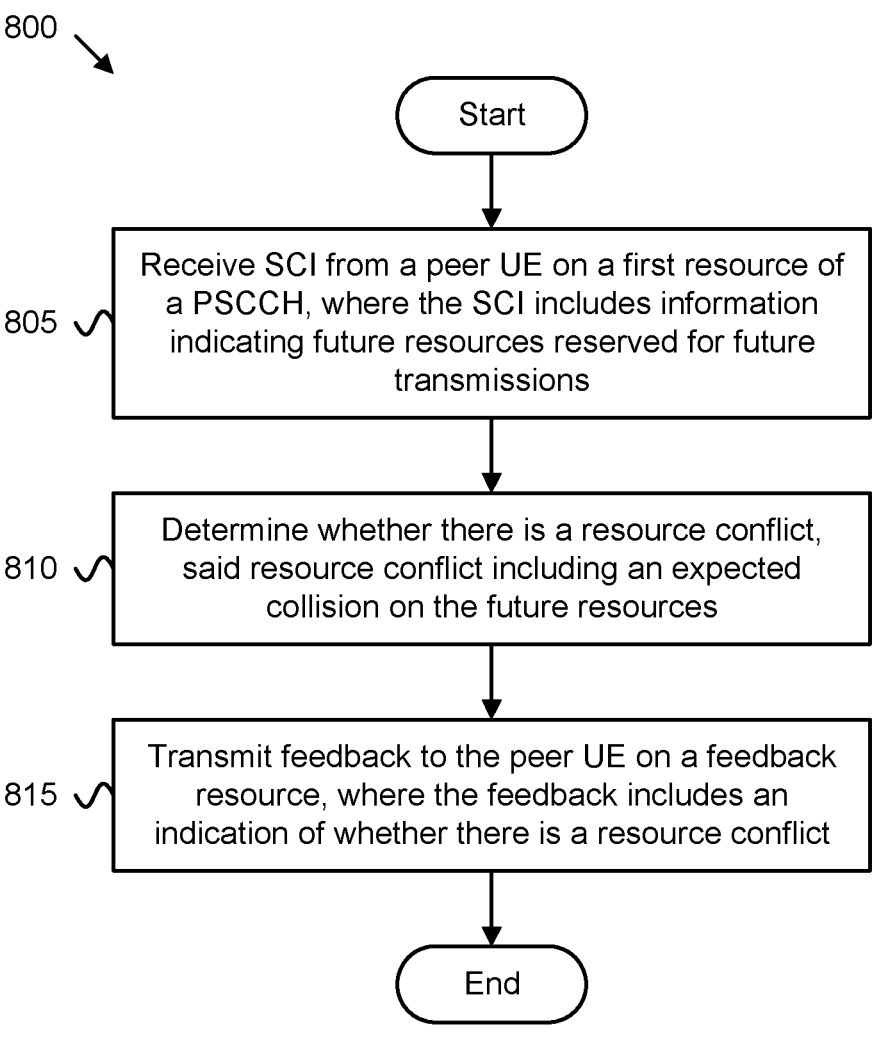

Start

805  Receive SCI from a peer UE on a first resource of a PSCCH, where the SCI includes information indicating future resources reserved for future transmissions 810  Determine whether there is a resource conflict, said resource conflict including an expected collision on the future resources 815  Transmit feedback to the peer UE on a feedback resource, where the feedback includes an indication of whether there is a resource conflict End

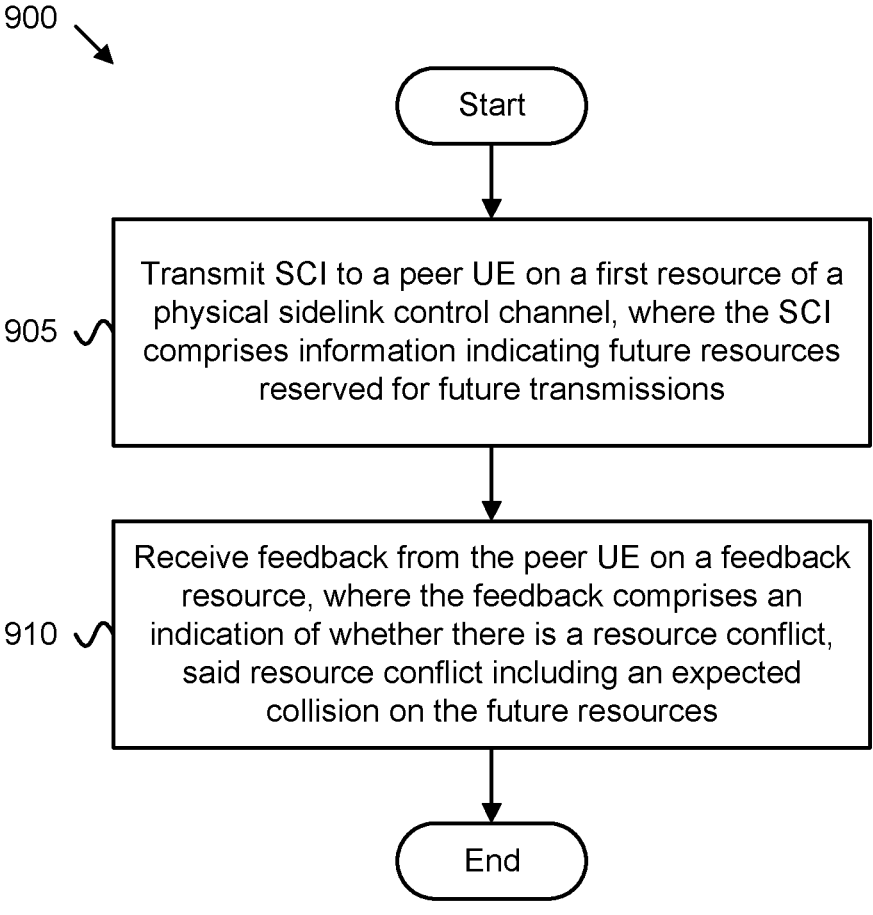

Start

Transmit SCI to a peer UE on a first resource of a physical sidelink control channel, where the SCI comprises information indicating future resources reserved for future transmissions

905

Receive feedback from the peer UE on a feedback resource, where the feedback comprises an indication of whether there is a resource conflict, said resource conflict including an expected collision on the future resources

910

End

FIG. 9

SIDELINK RESOURCE CONFLICT INDICATION

CROSS-REFERENCE TO RELATED APPLICATIONS

This application claims priority to U.S. Provisional Patent Application No. 63/121,814 entitled "SIDELINK RESOURCE CONFLICT INDICATION USING A FEED-BACK CHANNEL" and filed on Dec. 4, 2020 for Karthikeyan Ganesan, Prateek Basu Mallick, Joachim Loehr, and Ravi Kuchibhotla, which application is incorporated herein by reference.

FIELD

The subject matter disclosed herein relates generally to wireless communications and more particularly relates to sidelink ("SL") resource conflict indication using a feedback channel.

BACKGROUND

Sidelink communication refers to peer-to-peer communication directly between User Equipment ("UE") devices. Accordingly, the UEs communicate with one another without the communications being relayed via the mobile network (i.e., without the need of a base station).

BRIEF SUMMARY

Disclosed are procedures for sidelink resource conflict indication using a feedback channel Said procedures may be implemented by apparatus, systems, methods, or computer program products.

One method of a Receiver User Equipment ("Rx UE") for indicating a sidelink resource conflict using a feedback channel includes receiving sidelink control information ("SCI") from a peer Transmitter User Equipment ("Tx UE") on a first resource of a physical sidelink control channel ("PSCCH"), where the SCI contains information indicating future resources reserved for future transmissions. The method includes determining whether there is a resource conflict and transmitting feedback to the peer Tx UE on a feedback resource, where the feedback includes an indication of whether there is a resource conflict, said resource conflict including an expected collision on the future resources.

One method of a Tx UE for indicating a sidelink resource conflict using a feedback channel includes transmitting SCI to a peer Rx UE on a first resource of a PSCCH, where the SCI contains information indicating future resources reserved for future transmissions. The method includes receiving feedback from the peer Rx UE on a feedback resource, wherein the feedback comprises an indication of whether there is a resource conflict, said resource conflict including an expected collision on the future resources.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flowchart diagram illustrating one embodiment of a first method for indicating a sidelink resource conflict using a feedback channel; and FIG. 9 is a flowchart diagram illustrating one embodiment of a second method for indicating a sidelink resource conflict using a feedback channel.

DETAILED DESCRIPTION

Figure 1:
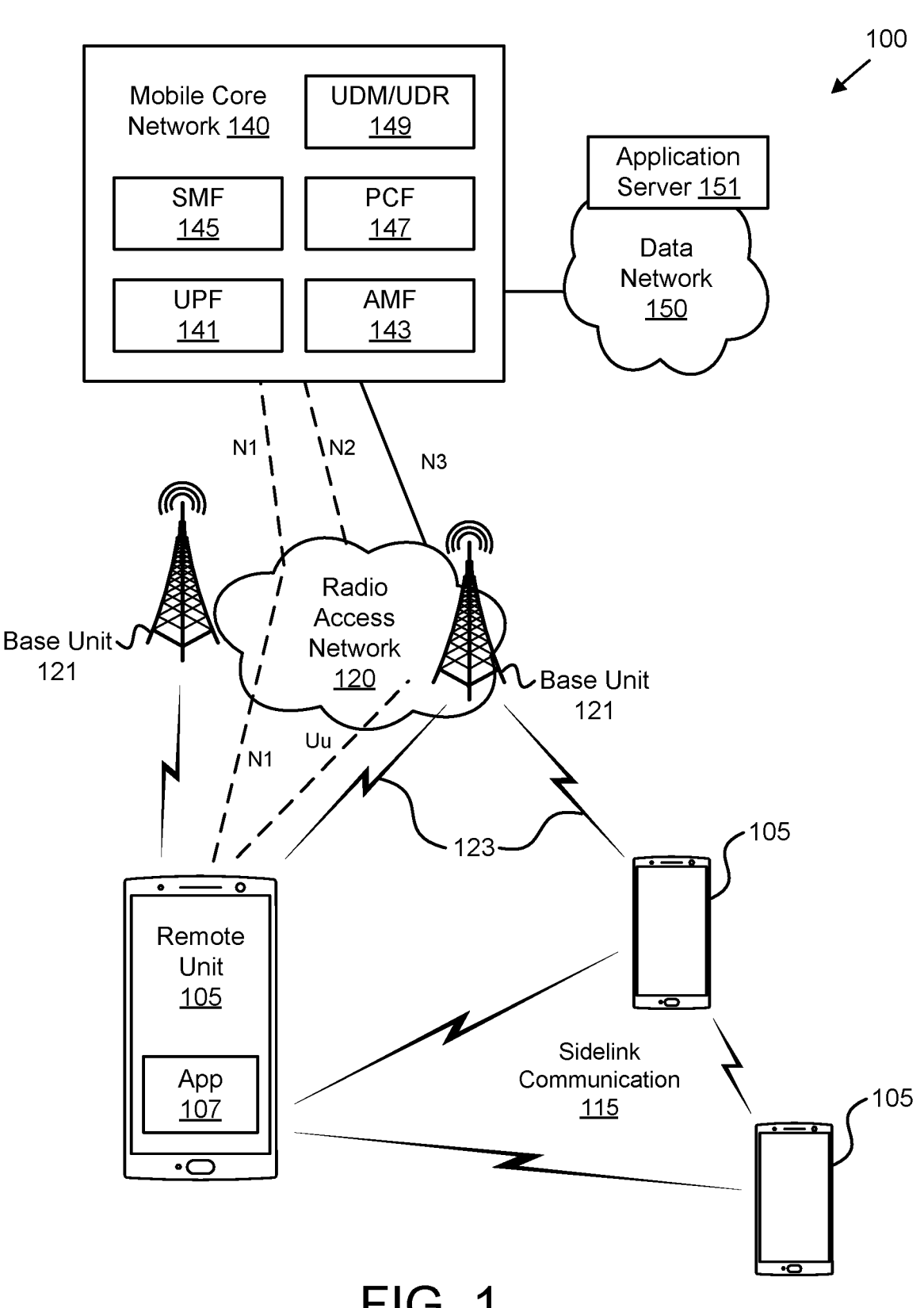
FIG. 1 is a block diagram illustrating one embodiment of a wireless communication system for indicating a sidelink resource conflict using a feedback channel.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code.

This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for enabling inter-UE coordination for efficient sidelink transmission when using sidelink DRX. In one embodiment, a set of resources is determined at a first SL UE, denoted UE-A. This set is sent to a second SL UE, denoted UE-B, in Mode-2 (i.e., UE-scheduled SL communication mode) and UE-B takes this into account in the resource selection for its own transmission. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Inter-UE coordination has the benefit of enhanced reliability and reduced latency. Specifically, Inter-UE coordination aids a transmitter UE select transmission resources that allow higher probability of successful transmission to a given receiver UE.

Various factors are associated with consecutive packet loss on the sidelink. The sources of error (in transmission) come due to one or more of the following factors:
   a. Half duplex issue where UE-A and UE-B are transmitting at the same time slot and cannot hear each other transmissions
   b. Poor radio resulting in, e.g., consecutive NACK(s)/ DTX reception from Rx UE(s)
   c. Congestion in the resource pool
   d. Interference at the receiver side due to hidden node
   With regards to Inter-UE coordination, some agreements in 3GPP are as follows: The schemes of inter-UE coordination in Mode 2 are categorized as being based on the following types of a set of resources, which is sent by UE-A to UE-B. In one embodiment, UE-A sends to UE-B the set of resources preferred for UE-B's transmission, e.g., based on UE-A's sensing result. In one embodiment, UE-A sends to UE-B the set of resources not preferred for UE-B's transmission, e.g., based on UE-A's sensing result and/or expected/potential resource conflict. In one embodiment, UE-A sends to UE-B the set of resource where the resource conflict is detected.

In certain embodiments, potential half duplex and/or collision detection and indication of conflict using a feedback channel for example, by a third UE monitoring the SCI can feedback NACK if it detects half duplex and/or resource conflict. However, transmitting combined NACK to indicate both SL HARQ-ACK reports and conflict for the initial transmission and reserved resources results in the retransmission of the initial transmission when UE decodes the initial transmission but decodes conflict.

To further improve conflict indication for sidelink communication, solutions are described below where the feedback channel configuration contains separate bits/separate resources for indicating HARQ-ACK reports and conflict indication. As used herein, "HARQ-ACK" may represent collectively the Positive Acknowledge ("ACK") and the Negative Acknowledge ("NACK") and Discontinuous Transmission ("DTX"). ACK means that a Transport Block ("TB")—also referred to as a "packet"—is correctly received while NACK (or NAK) means a TB is erroneously received and DTX means that no TB was detected.

In various embodiments, the feedback channel contains separate bits and/or separate resources for indicating HARQ-ACK reports and conflict indication and then multiple solutions for resource conflict indication using multibit Physical Sidelink Feedback Channel ("PSFCH"), where first bit indicate SL HARQ-ACK report and remaining bit provides conflict indication for the reserved resources. In certain embodiments, resource separation between HARQ-ACK and resource conflict may be according to frequency-domain multiplexing or time-domain multiplexing. Finally, a separate PSFCH occasion may be configured for the conflict indication. In some embodiments, PSFCH format 0 is used to convey the presence of expected/potential resource conflict on reserved resource(s) indicated by UE-B's SCI.

In certain embodiments, there is additional information as part of assistance information signaling. Disable/Enabling of assistance information and finally additional parameters in the sensing procedure for selecting preferred and non-preferred resource set.

FIG. 1 depicts a wireless communication system 100 for indicating a sidelink resource conflict using a feedback channel, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals carried over the wireless communication links 123. Furthermore, the UL communication signals may comprise one or more downlink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

In various embodiments, the remote units 105 may communicate directly with each other (e.g., device-to-device communication) using sidelink ("SL") communication signals 115. Here, SL transmissions may occur on SL resources, for example on the Physical Sidelink Control Channel ("PSCCH"), Physical Sidelink Feedback Channel ("PSFCH"), and/or Physical Sidelink Shared Channel ("PSSCH").

While FIG. 1 depicts components of a 5G RAN and a 5G core network, the described embodiments for indicating a sidelink resource conflict using a feedback channel apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base unit 121 but it is replaceable by any other radio access node, e.g., RAN node, BS, eNB, gNB, Access Point ("AP"), etc. Additionally, the term "UE" is used for the mobile station/remote unit, but it is replaceable by any other remote device, e.g., remote unit, MS, ME, Customer Premise Equipment ("CPE"), etc. Further, the operations are described mainly in the context of 5G NR. However, the below described solutions/methods are also equally applicable to other mobile communication systems for indicating a sidelink resource conflict using a feedback channel.

In duplex communication, the connected entities (e.g., UEs) are able to communicate with one another in both directions, i.e., the duplex UE can both transmit and receive. Duplex communication can be grouped into two types: full-duplex and half-duplex. In a full-duplex system, both entities (i.e., UEs) can communicate with each other simultaneously, i.e., the devices can transmit while simultaneously receiving. However, in a half-duplex system, both entities (UEs) can transmit and receive, but not simultaneously.

In LTE and NR, sidelink communication is a half-duplex scheme. Accordingly, when a first sidelink UE (denoted "UE-1") transmits during a given time slot, it cannot receive a transmission from a second sidelink UE (denoted "UE-2")

that is made during the same time slot. Similarly, the UE-2 cannot receive the transmission from UE-1 due to the two sidelink UE transmitting during the same time slot. Note, however, that a third sidelink UE (denoted "UE-3") is able to receive both the UE-1's transmission and the UE-2's transmission during the same time slot when the UE-1 uses a different frequency resource to transmit than the UE-2.

Moreover, traditional schemes for sidelink communication assume that peer UEs are perpetually available for reception and transmission and therefore only find suitable resources using Inter-UE coordination given a packet delay budget ("PDB") constraint. However, if the peer UEs use a DRX configuration to save power, then the peer UEs are not perpetually available for reception and transmission, thus disrupting Inter-UE coordination.

Therefore, to enhance Inter-UE coordination, the peer UE behavior is modified to indicate a sidelink resource conflict using a feedback channel.

In a first solution, the feedback channel contains separate bits/separate resources for indicating Hybrid Automatic Repeat Request ("HARQ") feedback (i.e., one or more HARQ-ACK reports) and resource conflict indication feedback. Here, the resource conflict indication may use multibit PSFCH, where first bit indicate SL HARQ-ACK report and remaining bit provides conflict indication for the reserved resources. In a first option, the conflict resource indication for all the reserved resource can be indicated by a single bit. In a second option, separate bits are assigned to provide feedback on each of the reserved resource.

The PSFCH resource may be configured for HARQ-ACK reports and conflict indication can be frequency-division multiplexed by allocating separate Physical Resource Blocks ("PRBs"), can be time-domain multiplexed by allocating resources in different symbols in the same slots. Multiple feedback occasions may be configured and each of the feedback occasion corresponds to a reserved resource. For allocating PSFCH resources in Scheme 2, at least the set of PRBs for PSFCH transmission/reception (sl-PSFCH-RB-Set) can be configured (or preconfigured) separately from those for SL HARQ-ACK feedback.

A time gap between the feedback and the reserved resource may be before or at m-T3 for each of the feedback occasion. After receiving the feedback and before (or at m-T3) the UE may decide—based on the conflict indication—to re-select the reserved resource. SCI may include signaling for enabling conflict indication.

A resource pool level configuration (or pre-configuration) may use either of the following options:

Option 1: the PSFCH occasion is derived by a slot where UE-B's SCI is transmitted. In this option, the PSSCH-to-PSFCH timing may be used as specified in 3GPP Technical Specification ("TS") 38.213 Section 16.3 to determine the PSFCH occasion for resource conflict indication. Additionally, a time gap between the PSFCH and a slot where expected/potential resource conflict occurs is larger than or equal to T3.

Option 2: PSFCH occasion is derived by a slot where expected/potential resource conflict occurs on PSSCH resource indicated by UE-B's SCI. In this option, the UE-A transmits the PSFCH in a latest slot that includes PSFCH resources for inter-UE coordination information and is at least T3 slots of the resource pool before the PSSCH resource indicated by UE-B's SCI in which expected/potential resource conflict occurs.

According to a second solution, the reporting of SL HARQ enable/disable or SL HARQ feedback Option 1, or SL HARQ feedback Option 2, or blind retransmission, or maximum number of blind retransmissions, is communicated as part of the assistance information to the UE-B.

According to a third solution, the gNB may enable/disable the inter-UE coordination functionality or a subset of functionality (such as preferred resource set, reserved resources, not preferred resource, conflict resource) per resource pool based on the channel busy ratio/channel occupancy ratio.

According to a fourth solution, a single subchannel configuration can be defined for the transmission of the assistance information, where the resource for the transmission of the assistance information can be reserved by another UE or the gNB (i.e., in sidelink resource allocation Mode 1). Regarding sidelink resource allocation, Mode 1 corresponds to a NR network-scheduled allocation mode, while Mode 2 corresponds to an NR UE-scheduled allocation mode. Mode-3 corresponds to an LTE network-scheduled allocation mode, while Mode-4 corresponds to an LTE UE-scheduled allocation mode.

According to a fifth solution, a parameter for candidate resource selection for determining preferred/non-preferred resources—additional Reference Signal Received Power ("RSRP") (alternatively, or additionally, the averaged Reference Signal Received Quality ("RSRQ") and/or Signal to Interference and Noise Ratio ("SINR")) threshold for the selection of preferred or non-preferred subset of resources to be reported. Additionally, higher layer parameter contains flag like earliest in time for the selection of preferred set of resource. Here, assistance information may contain active UL Configured Grant ("CG") resource configuration like time/frequency resource, periodicity, etc.

Figure 2:
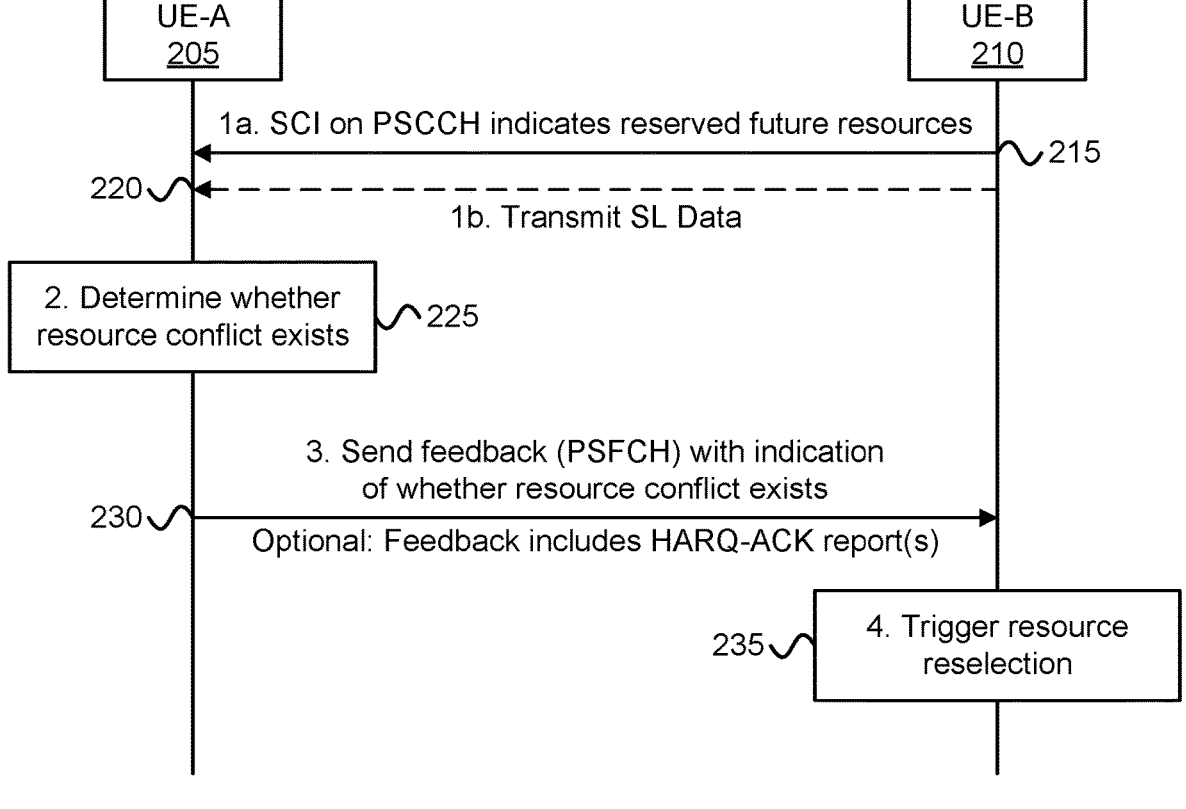
FIG. 2 is a call-flow diagram illustrating one embodiment of indicating a sidelink resource conflict using a feedback channel.

FIG. 2 depicts exemplary message flow of a procedure 200 for indicating a sidelink resource conflict using a feedback channel, according to embodiments of the first solution. The procedure 200 involves a first sidelink UE, denoted UE-A 205, and a sidelink second UE, denoted UE-B 210, each of which may be an embodiment of the remote unit 105.

The procedure 200 begins at Step 1a as the UE-B 210 sends SCI on Physical Sidelink Control Channel ("PSCCH") to the UE-A 205 (see messaging 215). Here, the SCI contains an indication of future resources that are reserved for future transmissions.

At Step 1b, the UE-B 210 also transmits sidelink data (e.g., an initial transmission) to the UE-A 205 (see messaging 220). Here, the SL data transmission accompanies the SCI containing the indication of future reserved resources.

At Step 2, the UE-A 205 determines a whether a resource conflict exists for the indicated future resources that are reserved for future transmissions (see block 225). In one embodiment, the resource conflict may be a time-domain collision (half-duplex problem). Alternatively, the resource conflict could be an expected time/frequency collision.

In some embodiments, the Rx UE determines the Set of sidelink resources by performing a sensing procedure and a sidelink resource selection procedure. Sensing results may be the averaged RSRP from the sensing slots for the candidate resource selection by considering the common active period between the UE-A 205 and the UE-B 210. Here, the determined Set of sidelink resources may include a preferable resource based on a sensing result, a non-preferable resource based on the sensing result, and/or a resource having a potential collision.

At Step 3, the UE-A 205 sends feedback to the UE-B 210 with an indication of whether a resource conflict exists (see messaging 230).

At Conditional Step 4, the UE-B 210 performs resource reselection if the feedback second set of feedback resources indicating the resource conflict (see block 235).

According to embodiments of the first solution, a Rx UE (e.g., UE-A 205) monitoring SCIs can provide feedback indicating about potentially expected conflict or past conflict indication using a feedback channel, wherein the feedback channel contains separate bits/separate resources for indicating HARQ-ACK reports and conflict indication.

Figures 3A, 3B:
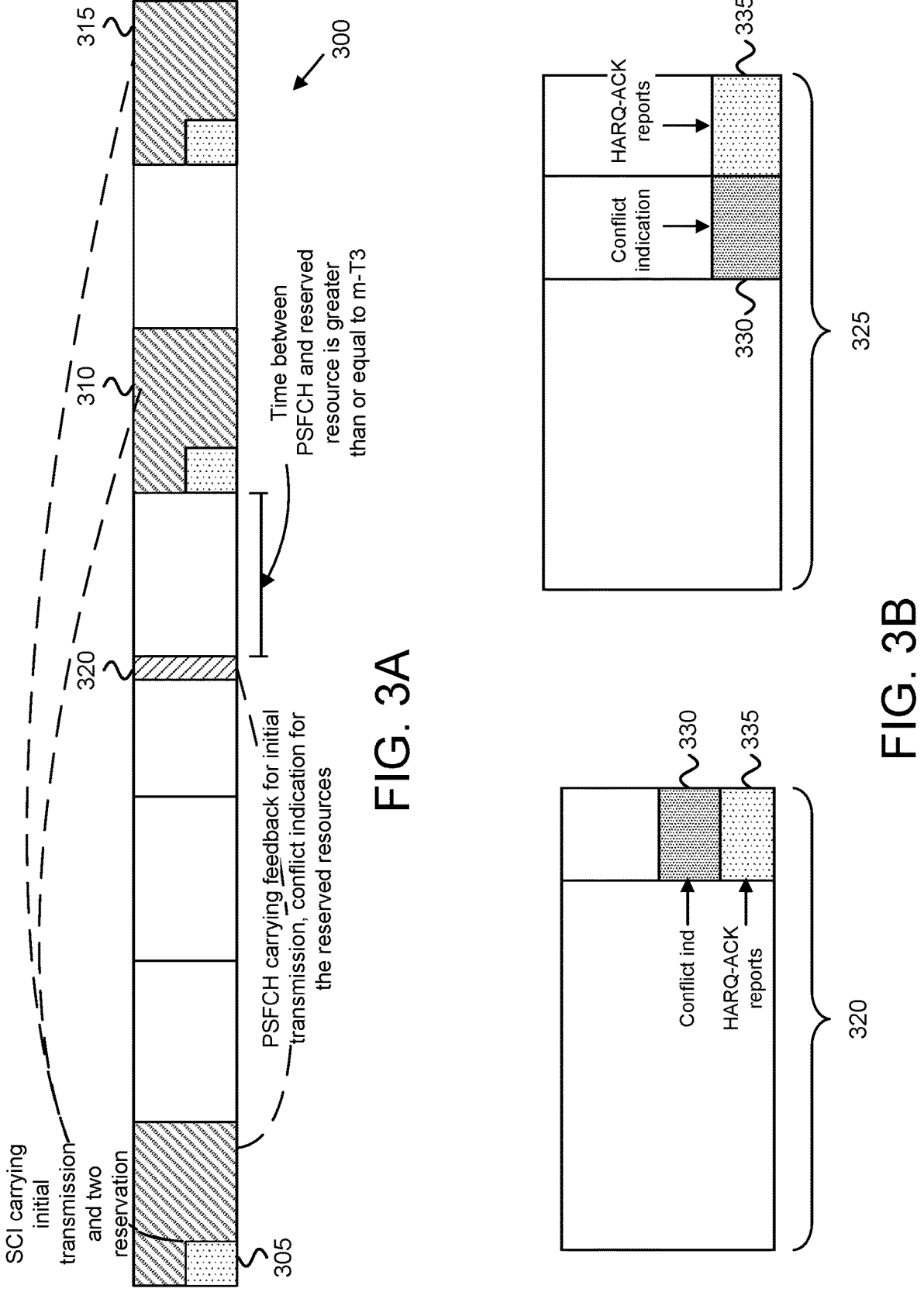
FIG. 3A is a diagram illustrating one embodiment of a frame structure with PSFCH resources for conflict indication.
FIG. 3B is a diagram illustrating one embodiment of PSFCH resources in a slot illustrating frequency-domain multiplex and time-domain multiplex options.

FIG. 3A-3B depict embodiments of resource conflict indication using dedicated bits/resources for conflict indication, according to embodiments of the first solution. In some embodiments, the feedback from the Rx UE comprises multi-bit PSFCH, where there is a separate resource for conflict indication.

FIG. 3A depicts a frame structure 300 with PSFCH resources for conflict indication, according to embodiments of the disclosure. The frame structure 300 comprises a plurality of slots. In a first slot, the Rx UE (e.g., UE-A 205) receives SCI 305 carrying an initial transmission and two reservations of future resources, i.e., at slot 310 and slot 315. It is assumed here that the SCI 305 enables conflict indication for the reserved resources. In further embodiments, the SCI 305 also enables HARQ feedback for the initial transmission.

At a time after reception of the SCI 305 and prior to the first of the reserved resources (i.e., in slot 310), the Rx UE transmits PSFCH 320 carrying feedback both for the initial transmission and conflict indication for the reserved resources. As discussed in further detail below, the feedback sent by Rx UE may comprise multi-bit PSFCH multiplexed in the frequency domain or in the time domain.

FIG. 3B depicts PSFCH resources in a slot illustrating frequency-domain multiplex 320 and time-domain multiplex 325 options, according to embodiments of the disclosure. In the frequency-domain multiplexing option 320, the multi-bit PSFCH comprises separate physical resource blocks for the HARQ report 335 and for the conflict indication 330 on a common symbol in the time domain. In the time-domain multiplexing option 325, the multi-bit PSFCH comprises separate symbols in the time domain physical resource blocks on a common slot for the HARQ report 335 and for the conflict indication 330, and on a common set of (i.e., one or more) physical resource blocks.

In a first implementation of the first solution, multi-bit PSFCH is proposed where first bit carries feedback about the initial transmission and the rest of the bits/last bit carries feedback about the conflict indication for the reserved transmission, if any. An example implementation is shown below in Table 1 where one or more dedicated bits are configured to report conflicted indication and SL HARQ-ACK reports. For a case when single conflict indication bit is configured for more than one reserved resource, those reserved resource needs to be re-selected when the conflict indication shows the presence of conflict.

TABLE 1

| Multi-bit PSFCH | | |
| --- | --- | --- |
| PSFCH bits | HARQ Feedback bit | "Conflict indication" bit |
| Two bits | First bit indicates HARQ-ACK report for the initial transmission | Second bit indicates the conflict indication for the reserved resources. 0 - indicate no conflict 1 - indicate conflict |
| More bits | First bit indicates HARQ-ACK | Each of the remaining bits indicate conflict indication for the reserved |

TABLE 1-continued

| Multi-bit PSFCH | | |
| --- | --- | --- |
| PSFCH bits | HARQ Feedback bit | "Conflict indication" bit |
| | report for the initial transmission | resources - number of remaining bits is equal to the number of reserved resources |

When dedicated bits are configured for each of the reserved resources then each of the resource resources can be re-selected based on the presence or absence of conflict indication.

In some embodiments, a separate PSFCH format may be defined for the purpose of multi-bit feedback and this format to be used for the transmission of PSFCH 320 can be indicated dynamically in the SCI 305. PSFCH formats to be used for the feedback transmission/conflict indication/transmitting a set of resource could be pre)-configured per resource pool or per UE by gNB using RRC signaling.

After receiving the information that there is a conflict in the reserved resources, the Tx UE (e.g., UE-B 210) can perform resource (re)selection trigger or reselect another resource from the candidate set. Otherwise, the Tx UE may select data (even from another logical channel) belonging to another destination id for transmission in the reserved resources.

Note that a Tx UE can perform resource (re)selection trigger or reselect another resource from the candidate set only when the PSFCH feedback arrives at or before resource (re)evaluation timeline/deadline which is m-T3 defined in 3GPP 38.213, where T3 is the time required to reselect the resource and m is the transmission time slot of the reserved resource.

As shown in FIG. 3B, separate PSFCH resources may be configured for HARQ-ACK report(s) 335 and the conflict indication 330, where resources could be frequency-domain multiplexed in the same PSFCH symbol with separate PRBs or time-domain multiplexed in different PSFCH symbols in the same slot.

Figure 4:
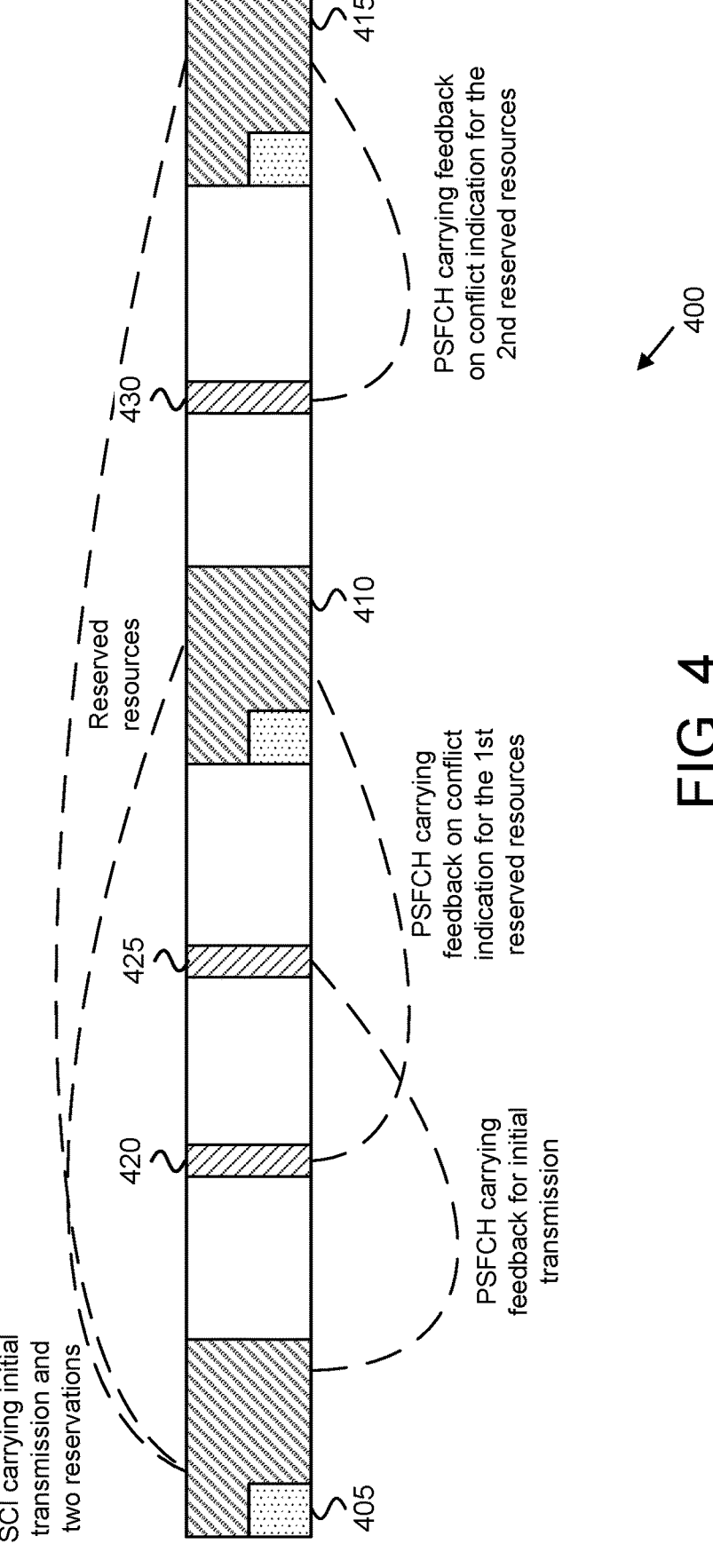
FIG. 4 is a diagram illustrating one embodiment of frame structure illustrating conflict indication and HARQ-ACK reports using PSFCH in different time slots.

FIG. 4 depicts a frame structure 400 illustrating conflict indication and HARQ-ACK reports using PSFCH in different time slots, according to embodiments of the disclosure. In another implementation of the first solution, separate PSFCH resources could be configured in different time slots as shown in FIG. 4 where the time slot offset for feedback could be configured differently configured for the HARQ-ACK compared to that of conflict indication. In a first slot, the Rx UE (e.g., UE-A 205) receives SCI 405 carrying an initial transmission and two reservations of future resources, i.e., at slot 410 and slot 415. It is assumed here that the SCI 405 enables conflict indication for the reserved resources and also enables HARQ feedback for the initial transmission.

At a time after reception of the SCI with the initial transmission, the Rx UE transmits PSFCH 420 carrying HARQ feedback for the initial transmission. At a time prior to the first of the reserved resources (i.e., in slot 410), the Rx UE transmits PSFCH 425 carrying conflict indication feedback for the first occurring of the reserved resources. At a time prior to the second of the reserved resources (i.e., in slot 415), the Rx UE transmits PSFCH 430 carrying conflict indication feedback for the second occurring of the reserved resources. Time slot offset (time gap) could be (pre)-configured per resource pool or dynamically indicated in the SCI 405. Multiple feedback occasions can be configured and each of the feedback occasion corresponds to a reserved resource. Time gap between the feedback and the reserved resource may be before or at m-T3 for each of the feedback occasion. After receiving the feedback before or at m-T3, the Tx UE (e.g., UE-B 210) may decide—based on the conflict indication—to re-select the reserved resource.

In one implementation, separate bits may be configured in SCI for dynamically signaling conflict indication enable/disable apart from the HARQ enable/disable and HARQ feedback. In another implementation, a common feedback resource for all reserved resource could be configured and in another implementation, a common feedback resource per reserved resources could be configured and, in one option, the reserved resources could be assigned different frequency-division multiplexing FDM resource and in another option, the reserved resources could be assigned with different cyclic shifts. A separate Minimum Communication Range ("MCR") value could be configured for the purpose of limiting the number of feedbacks on the common feedback resources which could be (pre)configured per resource pool or signaled in SCI.

In various embodiments, the following monitoring conditions are applied for half duplex/collision detection:

If the destination group identifier is identical and/or the resource selected by the group member Tx UE(s) occupies the same time slot, then there is a potential half duplex problem and provide feedback to the Tx UE(s).

If the destination group identifier is NOT identical and/or the resource selected by the group member Tx UE(s) are not occupying the same time slot, then there is no half duplex problem and provide feedback to the Tx UE(s)

If the destination group identifier is NOT identical and/or the resource selected by the group member Tx UE(s) are occupying the same time slot, then there is a potential half duplex problem, and the Rx UE(s) may or may not provide feedback to the Tx UE(s).

Additional details of these monitoring conditions are described in U.S. Patent Application Publication US 2021/0058905 A1 titled "USING A CONFIGURED FEEDBACK RESOURCE FOR FEEDBACK" and filed on Aug. 19, 2019 for Karthikeyan Ganesan, Prateek Basu Mallick, Joachim Loehr, Alexander Johann Maria Golitschek Edler von Elbwart, and Ravi Kuchibhotla, which application is incorporated herein by reference.

According to embodiments of the second solution, there is reporting of HARQ enable/disable assistance information to Tx UE. In the second solution, UE-A may assist UE-B by aiding information related to SL HARQ enable/disable or feedback Option 1 or Option 2 or blind retransmission or maximum number of blind retransmissions. The UE-B, after receiving the assistance information from UE-A, may consider the assistance information for next scheduling period/slot. For example, UE-B may switch between blind retransmission and HARQ based retransmission based on the assistance information.

For example, if the logical channel ("LCH") of the UE-B does not enable SL HARQ feedback but the UE-A assistance information contains request to enable SL HARQ feedback then in one implementation UE-B may follow the LCH configuration. In another example, UE-B may override the LCH configuration and follow the request in the assistance information. A separate configuration may be defined whether UE-B follows the LCH configuration or requests in the assistance information. Similarly, the UE-A may assist the UE-B for the transmission of Channel State Information Reference Signal ("CSI-RS") or Channel State Information ("CSI") trigger, by transmitting a request for the transmission of CSI-RS.

According to embodiments of the third solution, there is disabling inter-UE coordination message per Resource pool based on Channel Busy Ratio and/or Channel occupancy Ratio ("CBR/CR") measurement. In the third solution, gNB may disable the inter-UE coordination functionality or a subset of functionality per resource pool based on the channel busy ratio/channel occupancy ratio. For example, when there is less congestion in a resource pool then gNB may disable the inter-UE coordination functionality or subset of functionality. As used herein, a "resource pool" refers to a set of resources assigned for sidelink operation. A resource pool consists of a set of resource blocks (i.e., Physical Resource Blocks ("PRB")) over one or more time units (e.g., subframe, slots, OFDM symbols). In some embodiments, the set of resource blocks comprises contiguous PRBs in the frequency domain. As used herein, a PRB refers to twelve consecutive subcarriers in the frequency domain. In certain embodiments, a UE may be configured with separate transmission resource pools ("Tx RPs") and reception resource pools ("Rx RPs"), where the Tx RP of one UE is associated with an Rx RP of another UE to enable sidelink communication.

Functionality/solutions of inter-UE coordination includes sharing of preferred resource set, reserved resources, not preferred resource, conflict resource. In one implementation, gNB may disable sharing of preferred resource set when there is less congestion in the channel. In another implementation, gNB may enable the inter-UE coordination functionality/solutions or a subset of functionality/solutions per resource pool based on the channel busy ratio/channel occupancy ratio.

According to embodiments of the fourth solution, there is a single subchannel configuration for transmitting assistance information. In the fourth solution, single subchannel configuration can be defined for the transmission of the assistance information, where the resource for the transmission of the assistance information can be reserved by another UE or the gNB (resource allocation mode 1).

In NR sidelink resource allocation Mode 1, a separate Scheduling Request ("SR") configuration can be associated with the assistance information or single subchannel configuration for requesting resource from the gNB for the transmission of the assistance information. Assistance information may be transmitted using 2nd SCI format and the single subchannel configuration may contain only 1st SCI and 2nd SCI.

According to embodiments of the fifth solution, there is a parameter for candidate resource selection for determining preferred/non-preferred resources. In the fifth solution, higher layer parameter contains information on determining the subset of resources to be reported to higher layers as part of preferred or non-preferred. There can be additional RSRP threshold for the selection of preferred or non-preferred subset of resources to be reported. Additionally, higher layer parameter contains flag like earliest in time for the selection of preferred set of resource.

In another implementation, resource pool configuration contains additional RSRP threshold for the selection of preferred or non-preferred subset of resources to be reported and/or flag like earliest in time. In another embodiment, the assistance information contains active UL CG resource configuration like time/frequency resource, periodicity. In another embodiment, the assistance information contains preferred SL CG resource from the UE-A to the UE-B, where this SL CG configuration may also be a gNB-scheduled type 1 and type 2 CG resource for sidelink devices and its duration.

In another embodiment, UE-A may perform a resource selection procedure by using a window (common active period between the UE-A and the UE-B) for estimating the averaged RSRP from the sensing slots for the candidate resource selection by considering the common active period between the UE-A and the UE-B. And the candidate exclusion process is performed only for the common active period between the UE-A and the UE-B by excluding slot which the UE did not monitor due to half duplex issues.

Figure 5:
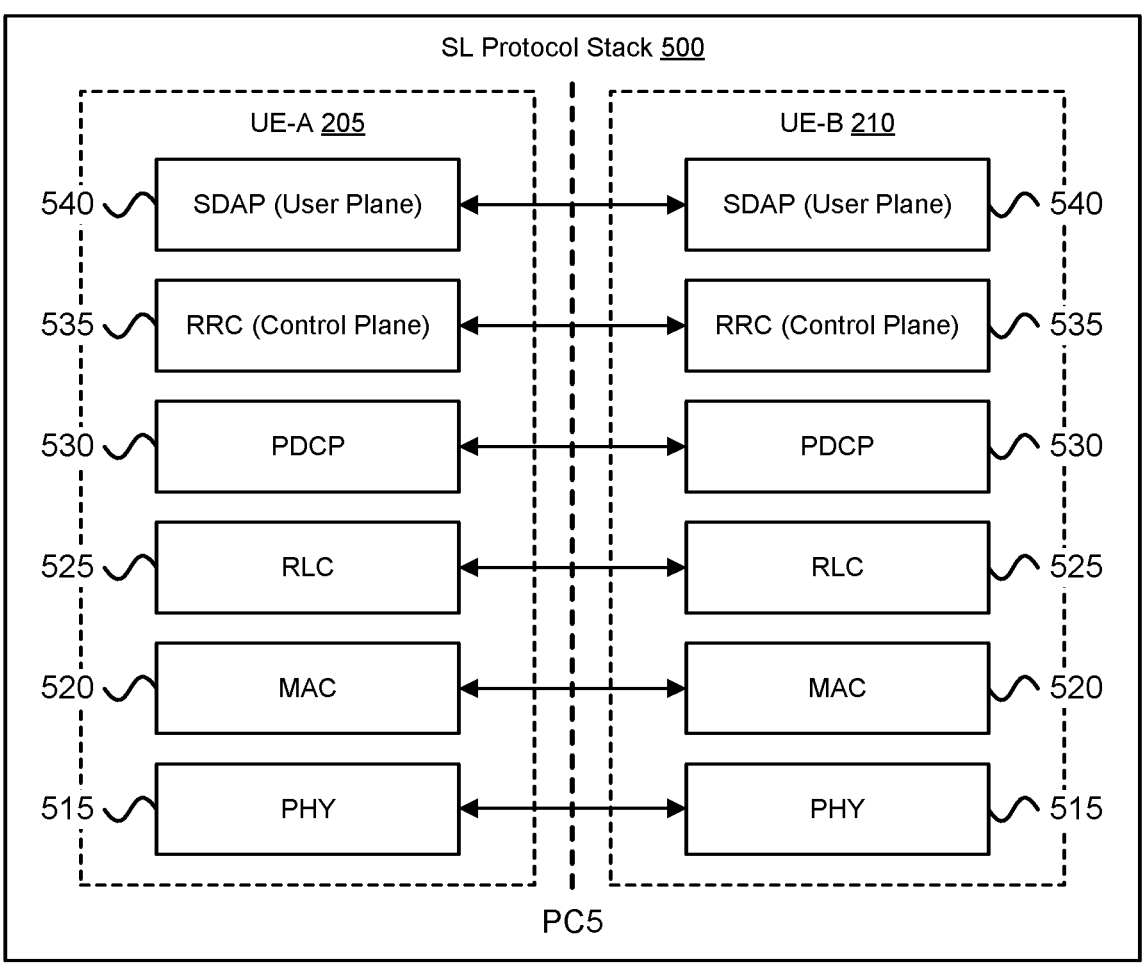
FIG. 5 is a block diagram illustrating one embodiment of a sidelink protocol stack.

FIG. 5 depicts a SL protocol stack 500, according to embodiments of the disclosure. While FIG. 5 shows a UE-A 205 and a UE-B 210, these are representative of a set of UEs using sidelink communication over a PC5 interface; other embodiments may involve different SL UEs. In various embodiments, each of the UE-A 205 and UE-B 210 may be an embodiment of the remote unit 105.

As depicted, the SL protocol stack (i.e., PC5 protocol stack) includes a physical ("PHY") layer 515 (also known as Layer-1 or "L1"), a MAC sublayer 520, a Radio Link Control ("RLC") sublayer 525, a Packet Data Convergence Protocol ("PDCP") sublayer 530, a Service Data Adaptation Protocol ("SDAP") layer 535 (e.g., for the user plane), and a Radio Resource Control ("RRC") layer 540 (e.g., for the control plane). There may be additional layers above the RRC and SDAP layers, such as an application layer (not shown).

The Access Stratum ("AS") layer (also referred to as "AS protocol stack") for the control plane in the PC5 interface consists of at least RRC, PDCP, RLC and MAC sublayers, and the physical layer. The AS layer (also referred to as "AS protocol stack") for the user plane in the PC5 interface consists of at least SDAP, PDCP, RLC and MAC sublayers, and the physical layer.

The Layer-1 ("L1") refers to the PI-TY layer 515. The Layer-2 ("L2") is split into the SDAP, PDCP, RLC and MAC sublayers. The Layer-3 ("L3") includes the RRC sublayer and the NAS layer for the control plane and includes, e.g., an Internet Protocol ("IP") layer or PDU Layer (not depicted) for the user plane. L1 and L2 are generally referred to as "lower layers," while L3 and above (e.g., transport layer, Vehicle-to-Everything ("V2X") layer, application layer) are referred to as "higher layers" or "upper layers."

The physical layer 515 offers transport channels to the MAC sublayer 520. The MAC sublayer 520 offers logical channels to the RLC sublayer 525. The RLC sublayer 525 offers RLC channels to the PDCP sublayer 530. The PDCP sublayer 530 offers radio bearers to the SDAP sublayer 535 and/or RRC layer 540. The SDAP sublayer 535 offers QoS flows to higher layers. The RRC layer 540 manages the establishment, configuration, maintenance, and release of Signaling Radio Bearers ("SRBs") and Data Radio Bearers ("DRBs").

In some embodiments, the PHY layer 515 determines the common active period between peer UEs and/or identifies the intersection between active time and the determined set of (sidelink) resources. As mentioned above, the PHY layer 515 may receive parameters and/or indication from the MAC layer 520. In other embodiments, MAC layer 520 may determine the common active period between peer UEs and/or identify the intersection between active time and the determined set of (sidelink) resources, where the MAC layer 520 receives parameters and/or indications from the PHY layer 515.

SCI format 1-A is used for the scheduling of PSSCH and $2^{nd}$-stage-SCI on PSSCH. The following information is transmitted by means of the SCI format 1-A:

Priority—3 bits as specified in clause 5.4.3.3 of 3GPP TS 23.287 and clause 5.22.1.3.1 of 3GPP TS 38.321.

Frequency resource assignment—

$$\left\lceil \log_2\left( \frac{N_{subChannel}^{SL}\left(N_{subChannel}^{SL} + 1\right)}{2} \right) \right\rceil$$

bits when the value of the higher layer parameter sl-MaxNumPerReserve is configured to 2; otherwise $$\left\lceil \log_2\left( \frac{N_{subChannel}^{SL}\left(N_{subChannel}^{SL} + 1\right)\left(2N_{subChannel}^{SL} + 1\right)}{6} \right) \right\rceil$$

bits when the value of the higher layer parameter sl-MaxNumPerReserve is configured to 3, as defined in clause 8.1.2.2 of 3GPP TS 38.214.

Time resource assignment—5 bits when the value of the higher layer parameter sl-MaxNumPerReserve is configured to 2; otherwise, 9 bits when the value of the higher layer parameter sl-MaxNumPerReserve is configured to 3, as defined in clause 8.1.2.1 of 3GPP TS 38.214.

Resource reservation period—$\lceil \log_2 N_{rsv\_period} \rceil$ bits as defined in clause 8.1.4 of 3GPP TS 38.214, where $N_{rsv\_period}$ is the number of entries in the higher layer parameter sl-ResourceReservePeriodList, if higher layer parameter sl-MultiReserveResource is configured; 0 bit otherwise.

Demodulation Reference Signal ("DMRS") pattern—$\lceil \log_2 N_{pattern} \rceil$ bits as defined in clause 8.4.1.1.2 of 3GPP TS 38.211, where $N_{pattern}$ is the number of DMRS patterns configured by higher layer parameter sl-PSSCH-DMRS-TimePatternList.

$2^{nd}$-stage SCI format—2 bits as defined in 3GPP TS 38.212, Table 8.3.1.1-1.

Beta_offset indicator—2 bits as provided by higher layer parameter sl-BetaOffsets2ndSCI and Table 8.3.1.1-2.

Number of DMRS port—1 bit as defined in 3GPP TS 38.212, Table 8.3.1.1-3.

Modulation and coding scheme—5 bits as defined in clause 8.1.3 of 3GPP TS 38.214.

Additional Modulation and Coding Scheme ("MCS") table indicator—as defined in clause 8.1.3.1 of 3GPP TS 38.214: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of 3GPP TS 38.214 if higher layer parameter sl-PSFCH-Period=2 or 4; 0 bit otherwise.

Reserved—a number of bits as determined by higher layer parameter sl-NumReservedBits, with value set to zero.

The fields defined in each of the $2^{nd}$-stage SCI formats below are mapped to the information bits $a_0$ to $a_{A-1}$ as follows: Each field is mapped in the order in which it appears in the description, with the first field mapped to the lowest order information bit $a_0$ and each successive field mapped to higher order information bits. The most significant bit of each field is mapped to the lowest order information bit for that field, e.g., the most significant bit of the first field is mapped to $a_0$.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits as defined in clause 16.4 of 3GPP TS 38.213.

New data indicator—1 bit as defined in clause 16.4 of 3GPP TS 38.213.

Redundancy version—2 bits as defined in clause 16.4 of 3GPP TS 38.214.

Source ID—8 bits as defined in clause 8.1 of 3GPP TS 38.214.

Destination ID—16 bits as defined in clause 8.1 of 3GPP TS 38.214.

HARQ feedback enabled/disabled indicator—1 bit as defined in clause 16.3 of 3GPP TS 38.213.

Cast type indicator—2 bits as defined in 3GPP TS 38.212, Table 8.4.1.1-1.

CSI request—1 bit as defined in clause 8.2.1 of 3GPP TS 38.214.

TABLE 2

Cast type indicator

| Value of Cast type indicator | Cast type |
|---|---|
| 00 | Broadcast |
| 01 | Groupcast (where HARQ-ACK information includes ACK or NACK) |
| 10 | Unicast |
| 11 | Groupcast (where HARQ-ACK information includes only NACK) |

SCI format 2-B is used for the decoding of PSSCH, with HARQ operation when HARQ-ACK information includes only NACK, or when there is no feedback of HARQ-ACK information. The following information is transmitted by means of the SCI format 2-B:

HARQ process number—4 bits as defined in clause 16.4 of 3GPP TS 38.213.

New data indicator—1 bit as defined in clause 16.4 of 3GPP TS 38.213.

Redundancy version—2 bits as defined in clause 16.4 of 3GPP TS 38.214.

Source ID—8 bits as defined in clause 8.1 of 3GPP TS 38.214.

Destination ID—16 bits as defined in clause 8.1 of 3GPP TS 38.214.

HARQ feedback enabled/disabled indicator—1 bit as defined in clause 16.3 of 3GPP TS 38.213.

Zone ID—12 bits as defined in clause 5.8.11 of 3GPP TS 38.331.

Communication range requirement—4 bits determined by higher layer parameter sl-ZoneConfigMCR-Index.

TABLE 3

2nd-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 4

Mapping of Beta_offset indicator values to indexes

| Value of Beta_offset indicator | Beta offset index (in Table 9.3-2 of 3GPP TS 38.213) |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

TABLE 5

Number of DMRS port(s)

| Value of the Number of DMRS port field | Antenna ports |
|---|---|
| 0 | 1000 |
| 1 | 1000 and 1001 |

Figure 6:
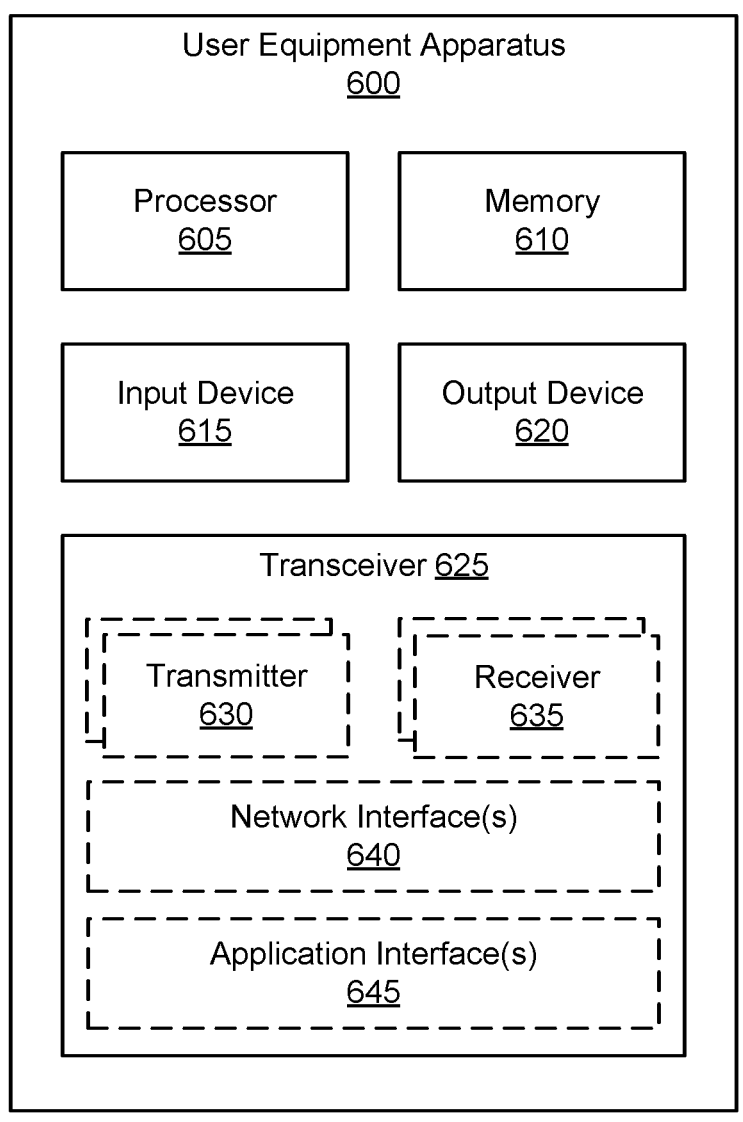
FIG. 6 is a block diagram illustrating one embodiment of a user equipment apparatus that may be used for indicating a sidelink resource conflict using a feedback channel.

FIG. 6 depicts a user equipment apparatus 600 that may be used for indicating a sidelink resource conflict using a feedback channel, according to embodiments of the disclosure. In various embodiments, the user equipment apparatus 600 is used to implement one or more of the solutions described above. The user equipment apparatus 600 may be one embodiment of the remote unit 105, the UE-A 205, the UE-B 210, the Rx UE-A, and/or the Tx UE, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panels supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PC5, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In certain embodiments, the processor 605 may include an application processor (also known as "main processor") which manages application-domain and operating system ("OS") functions and a baseband processor (also known as "baseband radio processor") which manages radio functions.

In various embodiments, the user equipment apparatus 600 is a Rx UE (e.g., the UE-A 205 and/or the Rx UE described above) that communicates with a peer Tx UE using sidelink communication resources, as described herein. In such embodiments, the processor 605 controls the user equipment apparatus 600 to perform the above described Rx UE behaviors.

In some embodiments, the transceiver 625 receives SCI from a peer UE on a first resource of a physical sidelink control channel, where the SCI comprises information indicating future resources reserved for future transmissions. The processor 605 determines whether there is a resource conflict, said resource conflict including an expected collision on the future resources. The transceiver 625 transmits feedback to the peer UE on a feedback resource, where the feedback includes an indication of whether there is a resource conflict.

In one embodiment, the resource conflict comprises a time-domain collision, i.e., resulting in the half-duplex problem described above. In another embodiment, the resource conflict comprises a time/frequency collision. In some embodiments, the SCI comprises a field (e.g., one bit) that indicates whether conflict indication is enabled. In certain embodiments, the SCI further comprises a second field (e.g., one bit) that indicates whether HARQ feedback is enabled.

In some embodiments, the transceiver 625 further receives an initial transmission of sidelink data, where the SCI is accompanied by the initial transmission. In such embodiments, the feedback includes a first set of feedback resources for indicating HARQ feedback (i.e., HARQ-ACK report(s)) and a second set of feedback resources for indicating whether there is a resource conflict. Here, the first set of feedback resources includes a HARQ feedback bit reporting one of: a positive acknowledgement (i.e., ACK) for the initial transmission and a negative acknowledgement (i.e., NACK) for the initial transmission.

In certain embodiments, the SCI indicates multiple reservations of future resources, where the second set of feedback resources includes a conflict indication bit for each reservation, and where each conflict indication bit indicates whether there is a resource conflict for a corresponding reservation. In other embodiments, the second set of feedback resources includes a single conflict indication bit that indicates whether there is a resource conflict for any of the future resources.

In certain embodiments, the first set of feedback resources and the second set of feedback resources includes separate physical resource blocks on a common symbol in the time domain. In certain embodiments, the first set of feedback resources and the second set of feedback resources includes separate symbols in the time domain on a common slot and on a common set of (i.e., one or more) physical resource blocks.

In various embodiments, the user equipment apparatus 600 is a Tx UE (e.g., the UE-B 210 and/or the Tx UE described above) that communicates with a peer Rx UE (e.g., UE-A 205) using sidelink communication resources, as described herein. In such embodiments, the processor 605 controls the user equipment apparatus 600 to perform the above described Tx UE behaviors.

In some embodiments, the processor 605 generates SCI that contains information indicating future resources reserved for future transmissions and controls the transceiver 625 to transmit the SCI to a peer UE on a first resource of a PSCCH. The transceiver 625 receives feedback from the peer UE on a feedback resource, where the feedback includes an indication of whether there is a resource conflict, said resource conflict including an expected collision on the future resources.

In some embodiments, the processor 605 triggers a resource reselection when the feedback from the peer UE indicates a resource conflict. In one embodiment, the resource conflict comprises a time-domain collision, i.e., resulting in the half-duplex problem described above. In another embodiment, the resource conflict comprises a time/frequency collision. In some embodiments, the SCI contains a field (i.e., one bit) that indicates whether conflict indication is enabled. In certain embodiments, the SCI further contains a second field (i.e., one bit) that indicates whether HARQ feedback is enabled.

In some embodiments, the transceiver 625 further transmits an initial transmission of sidelink data, where the SCI is accompanied by the initial transmission. In such embodiments, the feedback includes a first set of feedback resources for indicating HARQ feedback (i.e., HARQ-ACK report(s)) and a second set of feedback resources for indicating whether there is a resource conflict. Here the first set of feedback resources includes a HARQ feedback bit reporting one of: a positive acknowledgement (i.e., ACK) for the initial transmission and a negative acknowledgement (i.e., NACK) for the initial transmission.

In certain embodiments, the SCI indicates multiple reservations of future resources, where the second set of feedback resources comprises a conflict indication bit for each reservation, each conflict indication bit indicating whether there is a resource conflict for a corresponding reservation. In other embodiments, the second set of feedback resources comprises a single conflict indication bit that indicates whether there is a resource conflict for any of the future resources.

In certain embodiments, first set of feedback resources and the second set of feedback resources include separate physical resource blocks on a common symbol in the time domain. In certain embodiments, the first set of feedback resources and the second set of feedback resources include separate symbols in the time domain on a common slot and on a common set of (i.e., one or more) physical resource blocks.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to indicating a sidelink resource conflict using a feedback channel and/or mobile operation. For example, the memory 610 may store various parameters, panel/beam configurations, resource assignments, policies, and the like as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
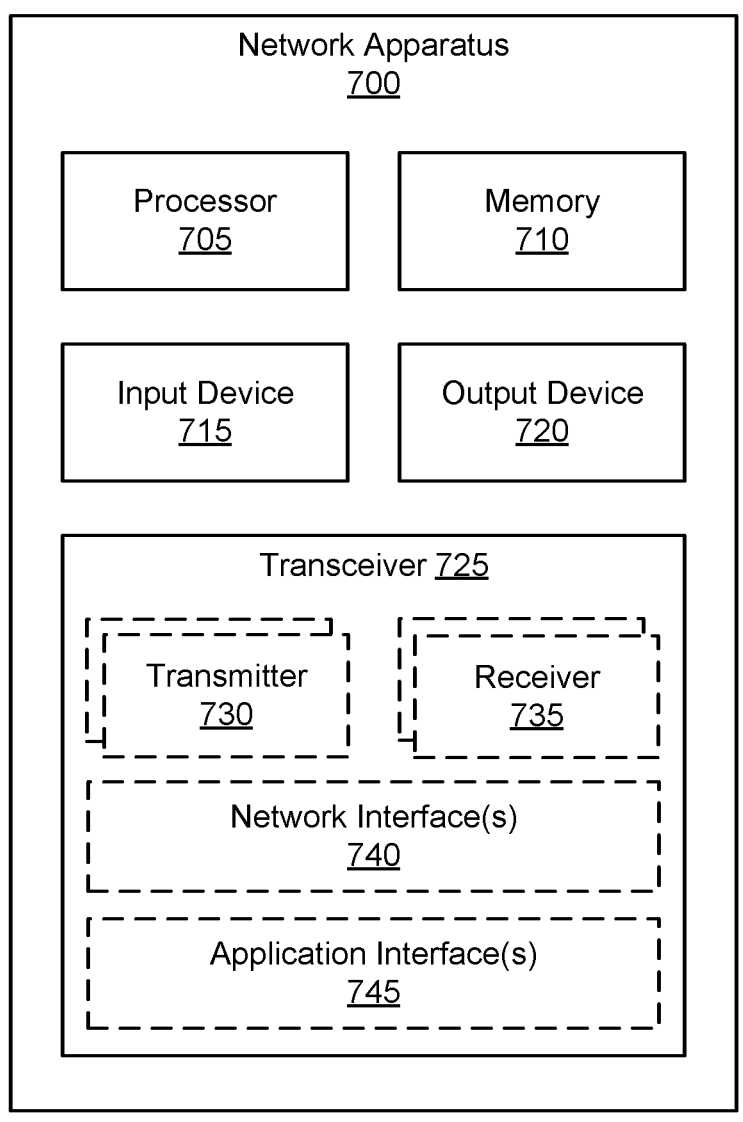
FIG. 7 is a block diagram illustrating one embodiment of a network apparatus that may be used for indicating a sidelink resource conflict using a feedback channel.

FIG. 7 depicts a network apparatus 700 that may be used for indicating a sidelink resource conflict using a feedback channel, according to embodiments of the disclosure. In one embodiment, network apparatus 700 may be one implementation of a RAN entity used to implement one or more of the above solutions. The network apparatus 700 may be one embodiment of the base unit 121, as described above. Furthermore, the network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 is a RAN node (e.g., gNB) that communicates with one or more UEs, as described herein. In such embodiments, the processor 705 controls the network apparatus 700 to perform the above described RAN behaviors. When operating as a RAN node, the processor 705 may include an application processor (also known as "main processor") which manages application-domain and operating system ("OS") functions and a baseband processor (also known as "baseband radio processor") which manages radio functions.

In some embodiments, the processor 705 may control the transceiver to send configurations and/or resource assignments for sidelink operation to one or more UEs.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to indicating a sidelink resource conflict using a feedback channel and/or mobile operation. For example, the memory 710 may store parameters, configurations, resource assignments, policies, and the like, as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the Public Land Mobile Network ("PLMN") and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

FIG. 8 depicts one embodiment of a method 800 for indicating a sidelink resource conflict using a feedback channel, according to embodiments of the disclosure. In various embodiments, the method 800 is performed by a Rx UE, such as the remote unit 105, the UE-A 205, the Rx UE, and/or the user equipment apparatus 600, described above as described above. In some embodiments, the method 800 is performed by a processor, such as a microcontroller, a microprocessor, a CPU, a GPU, an auxiliary processing unit, a FPGA, or the like.

The method 800 begins and receives 805 SCI from a peer UE on a first resource of a PSCCH, where the SCI includes information indicating future resources reserved for future transmissions. The method 800 includes determines 810 whether there is a resource conflict, said resource conflict including an expected collision on the future resources. The method 800 includes transmitting 815 feedback to the peer UE on a feedback resource, where the feedback includes an indication of whether there is a resource conflict. The method 800 ends. In one embodiment, the resource conflict comprises a time-domain collision, i.e., resulting in the half-duplex problem described above. In another embodiment, the resource conflict comprises a time/frequency collision.

FIG. 9 depicts one embodiment of a method 900 for indicating a sidelink resource conflict using a feedback channel, according to embodiments of the disclosure. In various embodiments, the method 900 is performed by a Tx UE device, such as the remote unit 105, the UE-B 210, the Tx UE, and/or the user equipment apparatus 600, described above as described above. In some embodiments, the method 900 is performed by a processor, such as a micro-controller, a microprocessor, a CPU, a GPU, an auxiliary processing unit, a FPGA, or the like.

The method 900 begins and transmits 905 SCI to a peer UE on a first resource of a physical sidelink control channel, where the SCI comprises information indicating future resources reserved for future transmissions. The method 900 includes receiving 910 feedback from the peer UE on a feedback resource, where the feedback comprises an indi-cation of whether there is a resource conflict, said resource conflict including an expected collision on the future resources. The method 900 ends. In one embodiment, the resource conflict comprises a time-domain collision, i.e., resulting in the half-duplex problem described above. In another embodiment, the resource conflict comprises a time/ frequency collision.

Disclosed herein is a first apparatus for indicating a sidelink resource conflict using a feedback channel, accord-ing to embodiments of the disclosure. The first apparatus may be implemented by a receiver UE, such as the remote unit 105, the UE-A 205, the Rx UE, and/or the user equipment apparatus 600, described above. The first appa-ratus includes a receiver that receives SCI from a peer UE on a first resource of a PSCCH, where the SCI contains information indicating future resources reserved for future transmissions. The first apparatus includes a processor that determines whether there is a resource conflict, said resource conflict including an expected collision on the future resources. The first apparatus includes a transmitter that transmits feedback to the peer UE on a feedback resource, where the feedback includes an indication of whether there is a resource conflict.

In one embodiment, the resource conflict comprises a time-domain collision, i.e., resulting in the half-duplex prob-lem described above. In another embodiment, the resource conflict comprises a time/frequency collision. In some embodiments, the SCI comprises a field (e.g., one bit) that indicates whether conflict indication is enabled. In certain embodiments, the SCI further comprises a second field (e.g., one bit) that indicates whether HARQ feedback is enabled.

In some embodiments, the receiver further receives an initial transmission of sidelink data, where the SCI is accom-panied by the initial transmission. In such embodiments, the feedback includes a first set of feedback resources for indicating HARQ feedback (i.e., HARQ-ACK report(s)) and a second set of feedback resources for indicating whether there is a resource conflict. Here, the first set of feedback resources includes a HARQ feedback bit reporting one of: a positive acknowledgement (i.e., ACK) for the initial trans-mission and a negative acknowledgement (i.e., NACK) for the initial transmission.

In certain embodiments, the SCI indicates multiple res-ervations of future resources, where the second set of feedback resources includes a conflict indication bit for each reservation, and where each conflict indication bit indicates whether there is a resource conflict for a corresponding reservation. In other embodiments, the second set of feed-back resources includes a single conflict indication bit that indicates whether there is a resource conflict for any of the future resources.

In certain embodiments, the first set of feedback resources and the second set of feedback resources include separate physical resource blocks on a common symbol in the time domain. In certain embodiments, the first set of feedback resources and the second set of feedback resources include separate symbols in the time domain on a common slot and on a common set of (i.e., one or more) physical resource blocks.

Disclosed herein is a first method for indicating a sidelink resource conflict using a feedback channel, according to embodiments of the disclosure. The first method may be performed by a receiver UE, such as the remote unit 105, the UE-A 205, the Rx UE, and/or the user equipment apparatus 600, described above. The first method includes receiving SCI from a peer Tx UE on a first resource of a PSCCH, where the SCI contains information indicating future resources reserved for future transmissions. The first method includes determining whether there is a resource conflict, said resource conflict including an expected collision on the future resources. The first method includes transmitting feedback to the peer UE on a feedback resource, where the feedback includes an indication of whether there is a resource conflict.

In one embodiment, the resource conflict comprises a time-domain collision, i.e., resulting in the half-duplex prob-lem described above. In another embodiment, the resource conflict comprises a time/frequency collision. In some embodiments, the SCI includes a field (e.g., one bit) that indicates whether conflict indication is enabled. In certain embodiments, the SCI further includes a second field (e.g., one bit) that indicates whether HARQ feedback is enabled.

In some embodiments, the first method further includes receiving an initial transmission of sidelink data, where the SCI is accompanied by the initial transmission. In such embodiments, the feedback includes a first set of feedback resources for indicating HARQ feedback (i.e., HARQ-ACK report(s)) and a second set of feedback resources for indi-cating whether there is a resource conflict. Here, the first set of feedback resources includes a HARQ feedback bit report-ing one of: a positive acknowledgement (i.e., ACK) for the initial transmission and a negative acknowledgement (i.e., NACK) for the initial transmission.

In certain embodiments, the SCI indicates multiple res-ervations of future resources, where the second set of feedback resources includes a conflict indication bit for each reservation, and where each conflict indication bit indicates whether there is a resource conflict for a corresponding reservation. In other embodiments, the second set of feed-back resources includes a single conflict indication bit that indicates whether there is a resource conflict for any of the future resources.

In certain embodiments, the first set of feedback resources and the second set of feedback resources include separate physical resource blocks on a common symbol in the time domain. In certain embodiments, the first set of feedback resources and the second set of feedback resources include separate symbols in the time domain on a common slot and on a common set of (i.e., one or more) physical resource blocks.

Disclosed herein is a second apparatus for indicating a sidelink resource conflict using a feedback channel, accord-ing to embodiments of the disclosure. The second apparatus may be implemented by a transmitter UE device, such as the remote unit 105, the UE-B 210, the Tx UE, and/or the user equipment apparatus 600, described above. The second apparatus includes a processor that generates SCI that con-tains information indicating future resources reserved for future transmissions and a transmitter that transmits the SCI to a peer UE on a first resource of a PSCCH. The second apparatus includes a receiver that receives feedback from the peer UE on a feedback resource, where the feedback includes an indication of whether there is a resource conflict, said resource conflict including an expected collision on the future resources.

In some embodiments, the processor triggers a resource reselection in response to the feedback from the peer UE indicating the resource conflict. In one embodiment, the resource conflict comprises a time-domain collision, i.e., resulting in the half-duplex problem described above. In another embodiment, the resource conflict comprises a time/frequency collision. In some embodiments, the SCI contains a field (i.e., one bit) that indicates whether conflict indication is enabled. In certain embodiments, the SCI further contains a second field (i.e., one bit) that indicates whether HARQ feedback is enabled.

In some embodiments, the transmitter further transmits an initial transmission of sidelink data, where the SCI is accompanied by the initial transmission. In such embodiments, the feedback includes a first set of feedback resources for indicating HARQ feedback (i.e., HARQ-ACK report(s)) and a second set of feedback resources for indicating whether there is a resource conflict. Here the first set of feedback resources includes a HARQ feedback bit reporting one of: a positive acknowledgement (i.e., ACK) for the initial transmission and a negative acknowledgement (i.e., NACK) for the initial transmission.

In certain embodiments, the SCI indicates multiple reservations of future resources, where the second set of feedback resources comprises a conflict indication bit for each reservation, each conflict indication bit indicating whether there is a resource conflict for a corresponding reservation. In other embodiments, the second set of feedback resources comprises a single conflict indication bit that indicates whether there is a resource conflict for any of the future resources.

In certain embodiments, first set of feedback resources and the second set of feedback resources include separate physical resource blocks on a common symbol in the time domain. In certain embodiments, the first set of feedback resources and the second set of feedback resources include separate symbols in the time domain on a common slot and on a common set of (i.e., one or more) physical resource blocks.

Disclosed herein is a second method for indicating a sidelink resource conflict using a feedback channel, according to embodiments of the disclosure. The second method may be performed by a transmitter UE device, such as the remote unit 105, the UE-B 210, the Tx UE, and/or the user equipment apparatus 600, described above. The second method includes transmitting the SCI to a peer UE on a first resource of a physical sidelink control channel, where the SCI contains information indicating future resources reserved for future transmissions. The second method includes receiving feedback from the peer UE on a feedback resource, where the feedback includes an indication of whether there is a resource conflict, said the resource conflict including an expected collision on the future resources.

In some embodiments, the second method further includes triggering a resource reselection in response to the feedback from the peer UE indicating the resource conflict. In one embodiment, the resource conflict comprises a time-domain collision, i.e., resulting in the half-duplex problem described above. In another embodiment, the resource conflict comprises a time/frequency collision. In some embodiments, the SCI contains a field (i.e., one bit) that indicates whether conflict indication is enabled. In certain embodiments, the SCI further contains a second field (i.e., one bit) that indicates whether HARQ feedback is enabled.

In some embodiments, the second method further includes transmitting an initial transmission of sidelink data, where the SCI is accompanied by the initial transmission. In such embodiments, the feedback includes a first set of feedback resources for indicating HARQ feedback (i.e., HARQ-ACK report(s)) and a second set of feedback resources for indicating whether there is a resource conflict. Here the first set of feedback resources includes a HARQ feedback bit reporting one of: a positive acknowledgement (i.e., ACK) for the initial transmission and a negative acknowledgement (i.e., NACK) for the initial transmission.

In certain embodiments, the SCI indicates multiple reservations of future resources, where the second set of feedback resources comprises a conflict indication bit for each reservation, each conflict indication bit indicating whether there is a resource conflict for a corresponding reservation. In other embodiments, the second set of feedback resources comprises a single conflict indication bit that indicates whether there is a resource conflict for any of the future resources.

In certain embodiments, first set of feedback resources and the second set of feedback resources include separate physical resource blocks on a common symbol in the time domain. In certain embodiments, the first set of feedback resources and the second set of feedback resources include separate symbols in the time domain on a common slot and on a common set of (i.e., one or more) physical resource blocks.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment ("UE"), the method comprising:
   receiving sidelink control information ("SCI") from a peer UE on a first resource of a physical sidelink control channel accompanied by an initial transmission of sidelink data, wherein the SCI comprises information indicating future resources reserved for future transmissions;
   determining whether there is a resource conflict, said resource conflict comprising an expected collision on the future resources; and
   transmitting feedback to the peer UE on a feedback resource, wherein the feedback comprises a first set of feedback resources for indicating hybrid automatic repeat request ("HARQ") feedback and a second set of feedback resources for indicating whether there is a resource conflict.

2. The method of claim 1, wherein the SCI comprises a field that indicates whether conflict indication is enabled.

3. The method of claim 2, wherein the SCI further comprises a second field that indicates whether hybrid automatic repeat request ("HARQ") feedback is enabled.

4. The method of claim 1, wherein the second set of feedback resources comprises a single conflict indication bit that indicates whether there is a resource conflict for any of the future resources.

5. The method of claim 1, wherein the SCI indicates multiple reservations of future resources, wherein the second set of feedback resources comprises a conflict indication bit for each reservation, each conflict indication bit indicating whether there is a resource conflict for a corresponding reservation.

6. The method of claim 1, wherein the first set of feedback resources and the second set of feedback resources comprise one of:

separate physical resource blocks on a common symbol in the time domain; and separate symbols in the time domain on a common slot and on a common set of physical resource blocks.

7. The method of claim 1, wherein the first set of feedback resources comprises a HARQ feedback bit reporting one of: a positive acknowledgement for the initial transmission or a negative acknowledgement for the initial transmission and the first and second sets of feedback resources are separated in at least one of a time domain and a frequency-domain.

8. A user equipment ("UE") for wireless communication, comprising:

a memory; and a processor coupled with the memory and configured to cause the UE to:

receive sidelink control information ("SCI") from a peer UE on a first resource of a physical sidelink control channel accompanied by an initial transmission of sidelink data, wherein the SCI comprises information indicating future resources reserved for future transmissions;

determine whether there is a resource conflict, wherein the resource conflict comprises an expected collision on the future resources; and transmit feedback to the peer UE on a feedback resource, wherein the feedback comprises a first set of feedback resources for indicating hybrid automatic repeat request ("HARQ") feedback and a second set of feedback resources for indicating whether there is a resource conflict.

9. The UE of claim 8, wherein the SCI comprises a field indicating whether conflict indication is enabled.

10. The UE of claim 8, wherein the SCI comprises a field indicating whether HARQ feedback is enabled.

11. The UE of claim 8, wherein the second set of feedback resources comprises a single conflict indication bit indicating whether there is a resource conflict for any of the future resources.

12. The UE of claim 8, wherein the SCI indicates multiple reservations of future resources, the second set of feedback resources comprises a conflict indication bit for each reservation, and each conflict indication bit indicates whether there is a resource conflict for a corresponding reservation.

13. The UE of claim 8, wherein the first set of feedback resources comprises a HARQ feedback bit reporting one of: a positive acknowledgement for the initial transmission or a negative acknowledgement for the initial transmission and the first and second sets of feedback resources are separated in at least one of a time domain and a frequency-domain.

14. A user equipment ("UE") for wireless communication, comprising:

a memory; and a processor coupled with the memory and configured to cause the UE to:

generate sidelink control information ("SCI") that comprises information indicating future resources reserved for future transmissions;

transmit, to a peer UE, the SCI on a first resource of a physical sidelink control channel accompanied by an initial transmission of sidelink data; and receive feedback from the peer UE on a feedback resource, wherein the feedback comprises a first set of feedback resources for indicating hybrid automatic repeat request ("HARQ") feedback and a second set of feedback resources for indicating whether there is a resource conflict, said resource conflict comprising an expected collision on the future resources.

15. The UE of claim 14, wherein the processor triggers a resource reselection in response to the feedback from the peer UE indicating the resource conflict.

16. The UE of claim 14, wherein the SCI comprises a field that indicates whether conflict indication is enabled.

17. The UE of claim 14, wherein the second set of feedback resources comprises a single conflict indication bit that indicates whether there is a resource conflict for any of the future resources.

18. The UE of claim 14, wherein the SCI indicates multiple reservations of future resources, wherein the second set of feedback resources comprises a conflict indication bit for each reservation, each conflict indication bit indicating whether there is a resource conflict for a corresponding reservation.

19. The UE of claim 14, wherein the first set of feedback resources and the second set of feedback resources comprise one of:

separate physical resource blocks on a common symbol in the time domain; and separate symbols in the time domain on a common slot and on a common set of physical resource blocks.

20. The UE of claim 14, wherein the first set of feedback resources comprises a HARQ feedback bit reporting one of: a positive acknowledgement for the initial transmission or a negative acknowledgement for the initial transmission and the first and second sets of feedback resources are separated in at least one of a time domain and a frequency-domain.

\* \* \* \* \*